Jan. 27, 1931.  A. W. WARD  1,790,334
ROLLER BEARING
Filed Nov. 26, 1927   3 Sheets-Sheet 1

Inventor
Andrew W. Ward
By C.A.Snow&Co.
Attorneys.

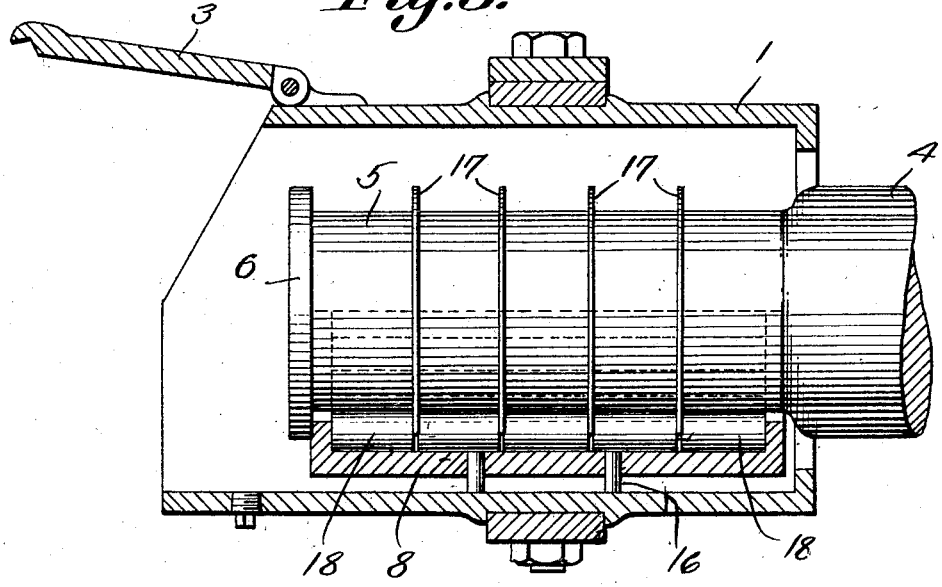
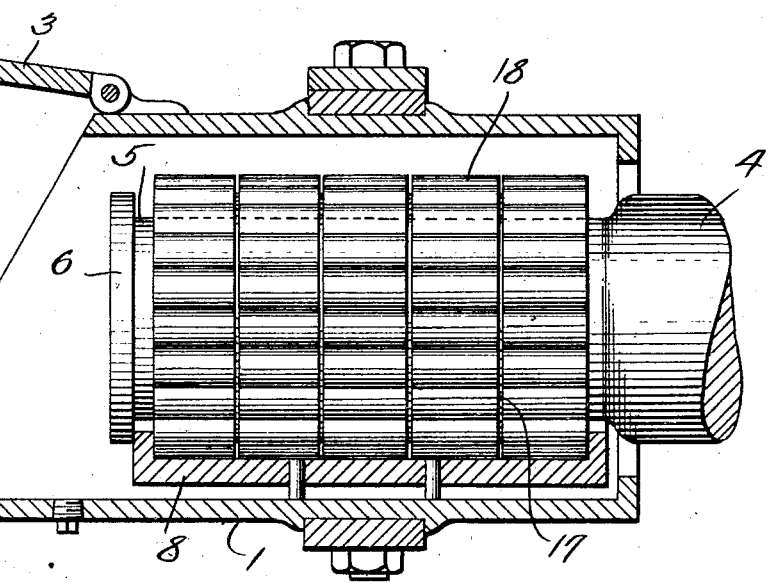

Jan. 27, 1931.  A. W. WARD  1,790,334
ROLLER BEARING
Filed Nov. 26, 1927  3 Sheets-Sheet 3
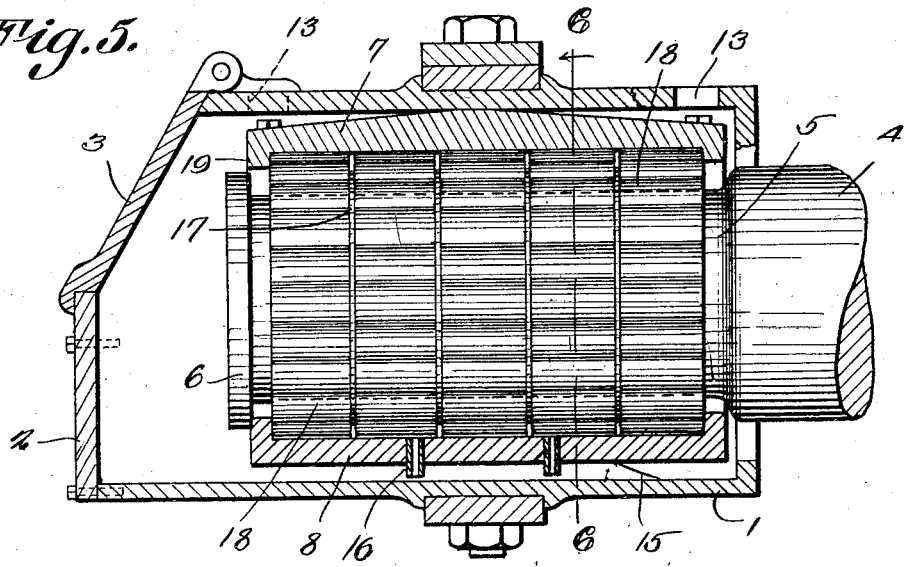
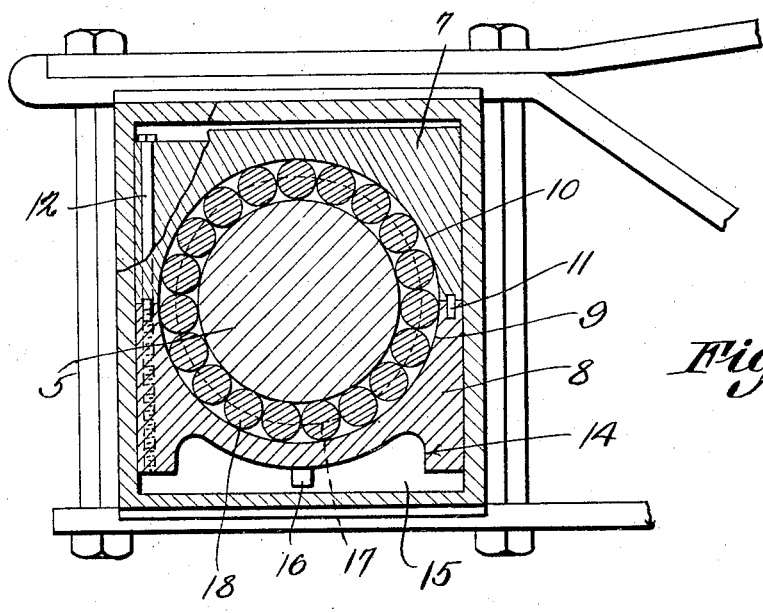
Inventor
Andrew W. Ward
By C.A. Snow & Co.
Attorneys Patented Jan. 27, 1931

1,790,334

UNITED STATES PATENT OFFICE

ANDREW W. WARD, OF CHARLESTON, WEST VIRGINIA, ASSIGNOR OF ONE-FOURTH TO EDWARD G. GREEN AND ONE-EIGHTH TO ROBERT L. SHUTE, BOTH OF CHARLESTON, WEST VIRGINIA

ROLLER BEARING

Application filed November 26, 1927. Serial No. 235,859.

This invention relates to a roller bearing designed primarily for use in connection with the spindle portions of the axles of railway rolling stock and it is designed primarily as an improvement upon the structure disclosed in my co-pending application Serial Number 67,632.

Heretofore, in order to produce an efficient roller bearing for the purpose stated it has been essential that the spindle portions of the axle be turned with such nicety as to eliminate even most minute variations in contour. It has been found that unless a spindle that is accurately turned is employed, the rollers in a cageless bearing will be worn unevenly or will produce uneven wear upon the engaged spindle resulting, ultimately, in the displacement of one or more of the rollers and consequent jamming of the working parts and resultant injury to the entire bearing. It has been determined, however, that the production of accurately turned axle spindles is exceedingly costly and practically impossible of accomplishment and for this reason cageless roller bearings of the type heretofore devised have not been found practical under actual working conditions.

It is an object of the present invention to provide a cageless roller bearing which is so constructed as to obviate the necessity of employing axle spindles so accurately turned as to be free of minute variations in contour, thereby greatly reducing the cost of installation of the bearing and rendering it more efficient.

A further object is to provide a bearing in which the anti-friction elements cannot become disarranged as the result of irregularity in the contour of the engaged spindle, the said cooperating parts, instead, remaining under all conditions in proper relation to each other and insuring smooth and uninterrupted operation at all speeds.

Another object is to provide a bearing of this type which can be easily installed.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings,

Figure 3 is a view similar to Figures 1 and 2 showing the relative positions of the parts after the actual spindle has been lowered into engagement with the anti-friction element carried by the lower shoe of the bearing.

Figure 4 is a view similar to Figure 3 showing the anti-friction elements arranged about the spindle prior to the installation of the upper shoe.

Figure 5 is a section through the journal box and the complete bearing.

Figure 6 is a vertical transverse section through the bearing taken on the line 6—6, Figure 5.

Figure 7 is a perspective view of two of the end portions of one of the split facing rings.

Figure 1:
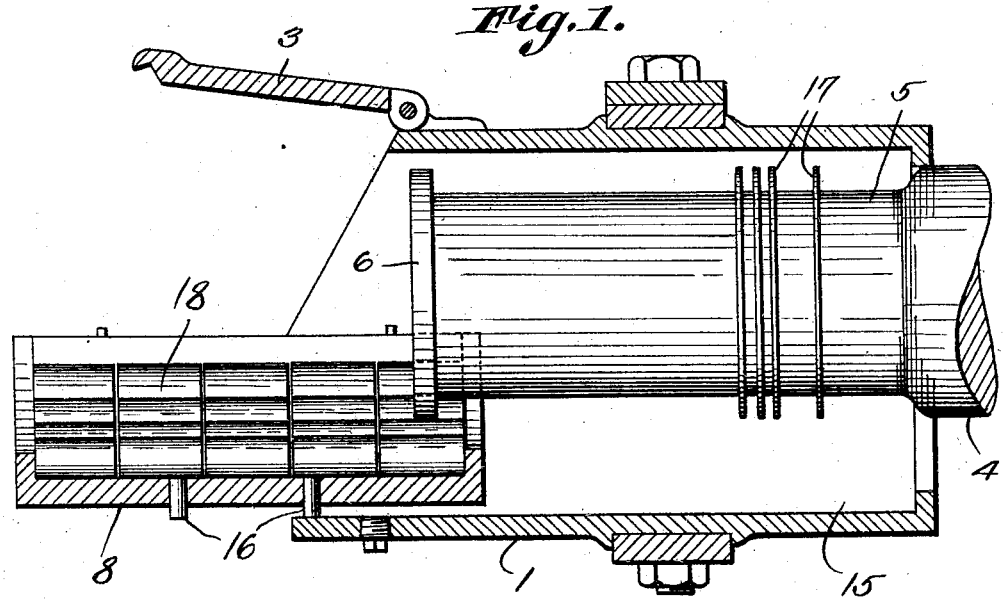
Figure 1 is a vertical section through a journal box and cooperating parts showing the first step in the installation of the bearing constituting the present invention.

Referring to the figures by characters of reference 1 designates the usual journal box or casing having a removable end plate 2 against which the lid 3 is adapted to close. A portion of the axle has been indicated at 4 and this is provided with a spindle 5 adapted to rotate within the box or casing 1. An integral collar 6 is formed around the free end portion of the spindle.

Arranged within the box or casing 1 are upper and lower shoes 7 and 8 fitting against the inner surfaces of the sides of the box and adapted to move relative thereto. The upper face of the lower shoe 8 has a cylindrical recess 9 while a similar recess 10 is provided in the lower face of the upper shoe 7. Thus when the two shoes are brought together as shown, for example, in Figure 6, the two recesses 9 and 10 will cooperate to provide a cylindrical opening through which the spindle 5 is extended. The shoes may be held against relative longitudinal movement by means of dowels 11 seated in the meeting portions thereof and said shoes can also be held together by tie screws 12 insertible downwardly through the corner portions of the upper shoes 7 into engagement with the corner portions of the lower shoe 8. The heads of these screws are exposed through openings 13 provided thereabove in the top of the top of the box or casing 1. Thus the screws can be readily placed in or removed from position while the bearing is being assembled or taken apart. The lower shoe 8 has its bottom face recessed as shown at 14 thereby to provide a lubricant chamber 15 extending throughout the length of and under the shoe 8 and communicating with the space between the end of plate 2 and the end of the spindle 5 within the box 1. At opposite sides of the center of this lower shoe 8 are short tubes 16 which open into the lubricant chamber 15 and serve to supply lubricant to the bearings during the operation thereof.

Arranged on the spindle 5 are spaced rings 17 each of which is preferably formed of two members having their ends lapped and interfitting to provide smooth faces at both sides of the ring. The lapping ends of the ring can be held together by rivets after the ring has been placed about the spindle 5. These rings are designed to fit loosely on the spindle so as to rotate freely thereon. They cooperate to produce annular races between them and about the end portions of the spindle, each race being adapted to receive an annular series of relatively short anti-friction rollers 18 designed to work upon the concave surfaces in the shoes 7 and 8.

Figure 2:
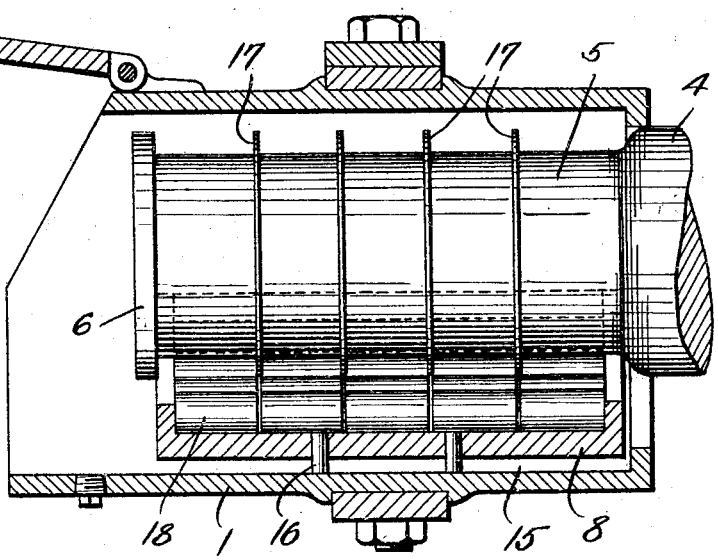
Figure 2 is a similar view showing the second step in the installation of the bearings.

In assembling the parts constituting the present invention the spindle 5 with the split rings fastened therearound is positioned in the box 1 and jacked up so as to be supported at the maximum distance above the bottom of the box as shown in Figure 1. The lower shoe 8 is provided with spaced parallel rows of rollers (preferably five rows), a suitable oil usually being employed to hold these rollers in the positions in which they are placed. Said shoe is then inserted into the box 1 through the open end thereof and under the spindle as shown in Figure 1. Thereafter the rings 17 are spaced apart distances equal to the length of the rollers so that by lowering the spindle the rings will move downwardly from the positions shown in Figure 2 to the positions shown in Figure 3. Additional rollers are then piled up between the rings and around the spindle so that a complete annular series of rollers will be located in each race defined by the rings. This arrangement of the rollers has been indicated in Figure 4. It will be understood that by using suitable oil the rollers can be held in position without the use of any other retaining means. Thereafter the upper shoe is slipped into the upper portion of the box 1 so as to overlie the annular series of rollers and after this upper shoe has been brought to proper position it is lowered onto the rollers and onto the shoe 8. The two shoes are then secured together by means of the screws 12 which are insertible through the opening 13. The end walls 19 of the recesses 9 and 10 will lap the end series of rollers 10 as shown in Figure 5 and the end walls 19 adjacent the free end of the spindle 5 will also constitute spacing means for holding the collar 6 properly spaced from the adjacent rollers 18. With the parts thus arranged the axle 4 is elevated by means of a jack or the box 1 can be lowered relative to the axle thereby to transfer the weight of the box and its load to the upper shoe. The plate 2 is of course fastened in position and the bearing is then ready for use. The upper shoe 7 will receive most of the wear because it is through this shoe that the weight of the load is transferred to the rollers. The lower shoe 8 will be held out of contact with the bottom of the box 1 and the lubricant chamber 15 can be filled with a lubricant. During the rotation of the spindle 5 each annular series of short anti-friction rollers will operate independently of the other series and the rollers of two of the series passing over the tubes 16 will pick up lubricant and spread it longitudinally of the bearing. The lubricant will also be transferred from one roller to the other so that the entire bearing will be kept covered with a film of lubricant. As relatively short rollers are used and the rollers of each series operate independently of the rollers of the remaining series it will be apparent that any irregularities in the contour of the spindle 5 will not tend to disarrange the rollers or to produce uneven wear upon the spindle. Instead the rollers will adapt themselves to the contour of the spindle with the result that correct working conditions will be maintained at all times.

What is claimed is:

1. The combination with a journal box and an axle spindle mounted for rotation therein having an end collar of superposed shoes movably mounted within the box, means within the box for clamping said shoes together, there being cooperating recesses within the shoes providing a cylindrical space in which that portion of the spindle back of the collar is mounted for rotation, said collar constituting means for engagement with the outer surface of one end of the shoes, separate rings loosely mounted on the spindle for independent rotation, said rings cooperating to provide spaced races around the spindle, an annular series of relatively short anti-friction rollers within each race movably engaging the shoes and spindle, the lower portion of the journal box constituting a lubricant container, and means for directing lubricant from said container through the lower shoe to separate series of rollers respectively.

2. The combination with a journal box having a removable end wall and a lid for contact with said wall, a spindle mounted for rotation in the box, and a collar at the free end of the spindle, of separate upper and lower shoes insertible successively into one end of the box to position in the upper and lower portions of said box and back of the collar, annular series of relatively short anti-friction rollers extending around the spindle and in movable engagement with the inner surfaces of the shoes, separately movable spacing rings between said series of rollers mounted on the spindle, and bolts within but out of contact with the box and engaging the shoes for binding them together with the collar lapping the shoes at one end, there being apertures in the box providing access to the bolts.

In testimony that I claim the foregoing as my own, I have hereto affixed my signature.

ANDREW W. WARD.